(12) United States Patent
Addink et al.

(10) Patent No.: US 6,895,987 B2
(45) Date of Patent: May 24, 2005

(54) DEVICE THAT MODIFIES IRRIGATION SCHEDULES OF EXISTING IRRIGATION CONTROLLERS

(75) Inventors: John W. Addink, Riverside, CA (US); Kirk Buhler, Corona, CA (US); Sylvan Addink, Riverside, CA (US)

(73) Assignee: Aqua Conserve, Inc., Riverside, CA (US)

( * ) Notice: Subject to any disclaimer, the term of this patent is extended or adjusted under 35 U.S.C. 154(b) by 1 day.

(21) Appl. No.: 10/417,722

(22) Filed: Apr. 16, 2003

(65) Prior Publication Data

US 2004/0206395 A1 Oct. 21, 2004

Related U.S. Application Data

(63) Continuation-in-part of application No. 10/343,350, filed as application No. PCT/US01/43500 on Nov. 14, 2001.

(51) Int. Cl.[7] .............................................. F16K 17/36
(52) U.S. Cl. ........................ 137/78.3; 137/80; 239/63; 239/64; 239/69; 700/284
(58) Field of Search .................... 137/78.3, 80; 239/63, 239/64, 69; 700/284

(56) References Cited

U.S. PATENT DOCUMENTS

| | | | | |
|---|---|---|---|---|
| 5,097,861 A | * | 3/1992 | Hopkins et al. ............ | 137/78.3 |
| 5,229,937 A | * | 7/1993 | Evelyn-Veere ............... | 700/284 |
| 5,341,831 A | | 8/1994 | Zur .............................. | 137/78 |
| 5,479,339 A | * | 12/1995 | Miller ........................ | 700/16 |
| 5,696,671 A | * | 12/1997 | Oliver ........................ | 700/284 |
| 5,870,302 A | * | 2/1999 | Oliver ........................ | 700/11 |
| 6,076,740 A | | 6/2000 | Townsend ....................... | 239/1 |
| 6,088,621 A | * | 7/2000 | Woytowitz et al. ........... | 700/16 |
| 6,145,755 A | * | 11/2000 | Feltz .............................. | 239/1 |
| 6,298,285 B1 | * | 10/2001 | Addink et al. .............. | 700/284 |
| 6,314,340 B1 | * | 11/2001 | Mecham et al. ........... | 700/284 |
| 6,453,216 B1 | * | 9/2002 | McCabe et al. ........... | 700/284 |

* cited by examiner

Primary Examiner—A. Michael Chambers
(74) Attorney, Agent, or Firm—Rutan & Tucker

(57) ABSTRACT

The present invention provides an irrigation control system in which a device (irrigation scheduler) automatically modifies irrigation schedules of installed irrigation controllers to affect irrigating of the landscape based on the water requirements of the landscape plants and comprises: providing an irrigation controller programmed to execute irrigations on watering days by closing an electrical circuit connecting the controller and at least one irrigation valve; providing an irrigation scheduler programmed to execute irrigations on substantially equivalent watering days as the irrigation controller; and the irrigation scheduler selectively interrupting the electrical circuit to control the execution of irrigations on watering days. Preferably the microprocessor uses either an ETo value or weather data used in calculating the ETo value to at least partially derive the improved irrigation schedule.

12 Claims, 4 Drawing Sheets

ETo Run-Time Minutes (ETo), Manual Irrigation Controller Run-Time Minutes (MIC), and the Irrigation Scheduler Run-Time Minutes (IS) Derived by The Microprocessor Disposed in the Irrigation Scheduler for July 1-15, 1999 for Riverside, CA.

| Day | 1 | 2 | 3 | 4 | 5 | 6 | 7 | 8 | 9 | 10 | 11 | 12 | 13 | 14 | 15 |
|-----|---|---|---|---|---|---|---|---|---|----|----|----|----|----|----|
| ETo | 14 | 14 | 13 | 14 | 17 | 16 | 14 | 2 | 14 | 16 | 16 | 17 | 17 | 16 | 15 |
| MIC | 21 | 21 | 21 |    | 21 | 21 | 21 | 21 | 21 | 21 |    | 21 | 21 | 21 | 21 |
| IS  |    |    | 21 |    | 21 | 21 | 21 |    |    | 21 |    | 21 | 21 | 21 | 21 |

Figure 4

DEVICE THAT MODIFIES IRRIGATION SCHEDULES OF EXISTING IRRIGATION CONTROLLERS

This application is a Continuation-in-part of utility application Ser. No. 10/343,350 filed on Jan. 29, 2003 which is the national phase application of PCT patent application number PCT/US01/43500 filed on Nov. 14, 2001.

FIELD OF THE INVENTION

The field of the invention is irrigation controllers.

BACKGROUND OF THE INVENTION

In arid areas of the world water is becoming one of the most precious natural resources. Meeting future water needs in these arid areas may require aggressive conservation measures. This requires irrigation systems that apply water to the landscape based on the water requirements of the plants. Many irrigation controllers have been developed for automatically controlling application of water to landscapes. Known irrigation controllers range from simple devices that control watering times based upon fixed schedules, to sophisticated devices that vary the watering schedules according to local geographic and climatic conditions.

With respect to the simpler types of irrigation controllers, a homeowner typically sets a watering schedule that involves specific run-times and days for each of a plurality of stations, and the controller executes the same schedule regardless of the season or weather conditions. From time to time the homeowner may manually adjust the watering schedule, but such adjustments are usually only made a few times during the year, and are based upon the homeowner's perceptions rather than actual watering needs. One change is often made in the late Spring when a portion of the yard becomes brown due to a lack of water. Another change is often made in the late Fall when the homeowner assumes that the vegetation does not require as much watering. These changes to the watering schedule are typically insufficient to achieve efficient watering.

More sophisticated irrigation controllers use evapotranspiration rates for determining the amount of water to be applied to a landscape. Evapotranspiration is the water lost by direct evaporation from the soil and plant and by transpiration from the plant surface. Potential evapotranspiration (ETo) can be calculated from meteorological data collected on-site, or from a similar site. One such system is discussed in U.S. Pat. No. 5,479,339 issued December, 1995, to Miller. Due to cost, most of the data for ETo calculations is gathered from off-site locations that are frequently operated by government agencies. Irrigation systems that use ETo data gathered from off-site locations are discussed in U.S. Pat. No. 5,023,787 issued June, 1991, and U.S. Pat. No. 5,229,937 issued July, 1993 both to Evelyn-Veere, U.S. Pat. No. 5,208,855, issued May, 1993, to Marian, U.S. Pat. No. 5,696,671, issued December, 1997, and U.S. Pat. No. 5,870,302, issued February, 1999, both to Oliver.

Due to cost and/or complicated operating requirements very few of these efficient irrigation controllers, discussed in the previous paragraph, are being installed on residential and small commercial landscape sites. Therefore, controllers that provide inadequate schedule modification primarily irrigate most residential and small commercial landscape sites. This results in either too much or too little water being applied to the landscape, which in turn results in both inefficient use of water and unnecessary stress on the plants. Therefore, a need existed for a cost-effective irrigation system for residential and small commercial landscape sites that is capable of frequently varying the irrigation schedule based upon estimates of actual water requirements. This need was met by U.S. Pat. No. 6,102,061, issued August, 2000 to Addink. However, there are thousands of manual irrigation controllers that have already been installed and are still being sold. Adjustments to these manual irrigation controllers are usually only made a few times during the year. The adjustments are based upon the homeowner's perceptions rather than actual watering needs of the landscape.

There are devices that can be connected to existing irrigation systems that will make automatic adjustments to the irrigation schedule, these interrupt or prevent one or more complete irrigation schedules from occurring. Examples of devices that interrupt or prevent the occurrence of planned irrigation schedules are rain sensors discussed in U.S. Pat. No. 4,613,764, issued September, 1986 to Lobato, U.S. Pat. No. 5,312,578, issued June, 1994 to Morrison et. al., U.S. Pat. No. 5,355,122 issued October, 1994 to Erickson, and U.S. Pat. No. 5,101,083, issued March, 1992 to Tyler, et al. There are other reasons for interrupting an irrigation schedule, such as; temperature extremes, high light intensity, high winds, and high humidity of which one or more of these are discussed in U.S. Pat. No. 5,839,660, issued November, 1998 to Morgenstern, et al., U.S. Pat. No. 5,853,122, issued December, 1998 to Caprio, U.S. Pat. No. 4,333,490 issued June, 1982 to Enter, S R., and U.S. Pat. No. 6,076,740, issued June, 2000 to Townsend. Additionally, there are patents that discuss the use of soil moisture sensors to control irrigation systems including U.S. Pat. No. 5,341,831, issued August, 1994 to Zur, U.S. Pat. No. 4,922,433, issued May, 1990 to Mark and U.S. Pat. No. 4,684,920 issued, August, 1987 to Reiter. However, as mentioned above, these devices, interrupt the operation of one or more full irrigation schedules or, as with the three above patents, rely on soil moisture sensors to control the irrigation applications. The disadvantage of soil moisture sensors is that the placement of the sensor(s) is critical to efficient irrigation.

What is needed is a cost effective device that will automatically modify the run-times of the irrigation schedules of installed irrigation controllers to affect irrigating of the landscape to meet the water requirements of the landscape plants based on some method or device other than a soil sensor.

SUMMARY OF THE INVENTION

The present invention provides an irrigation control system in which a device (irrigation scheduler) automatically modifies irrigation schedules of installed irrigation controllers. The inventive subject matter considers water requirements of the landscape plants, and generally comprises the following steps: providing an irrigation controller programmed to execute irrigations on watering days by closing an electrical circuit connecting the controller and at least one irrigation valve; providing an irrigation programmed to execute irrigations on substantially the same (i.e. substantially equivalent) watering days as the irrigation controller; and the irrigation scheduler selectively interrupting the electrical circuit to control the execution of irrigations on watering days.

In a preferred embodiment of the present invention, the irrigation scheduler is not an integral part of the irrigation controller. This means that the irrigation controller generally operates absent an irrigation scheduler. In this preferred embodiment, irrigations on watering days are at least partially determined by a microprocessor that is disposed in the irrigation scheduler.

The microprocessor uses a switching circuit to cause interference with the valve reception of the control signals output by the irrigation controller. The output is an electrical signal that controls the opening and closing of at least one irrigation valve.

Preferably, the microprocessor, disposed in the irrigation scheduler, uses at least one of an ETo value and a weather data used in calculating the ETo value to at least partially derive the days, of the watering days, the irrigations will be executed on. Furthermore, the weather data is at least one of temperature, humidity, solar radiation, and wind.

The ETo value may be a current ETo value, an estimated ETo value or an historical ETo value.

In a preferred embodiment of the present invention, the microprocessor is programmed to receive inputs that control when the microprocessor is able to interrupt the electrical circuit to prevent or enable the execution of irrigations by the irrigation controller.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 4 is data that illustrates the irrigation scheduler selectively interrupting the electrical circuit to control the execution of irrigations on watering days.

DETAILED DESCRIPTION

Figure 1:
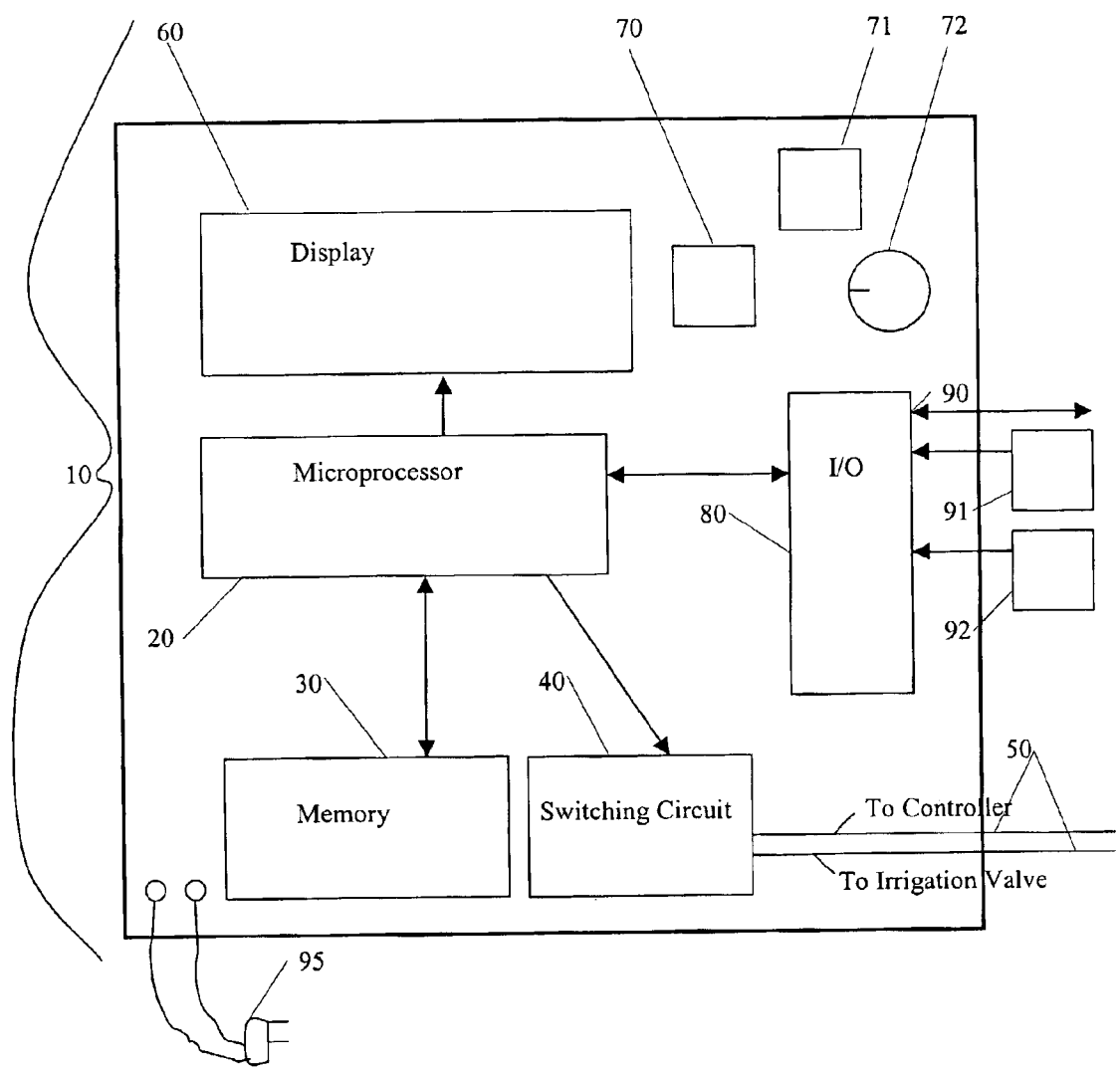
FIG. 1 is a schematic of an irrigation scheduler.

Referring to FIG. 1, the irrigation scheduler 10 according to the present invention includes a microprocessor 20, an on-board memory 30, a switching circuit 40, a display 60, some manual input devices 70 through 72 (e.g. knobs and/or buttons), an input/output (I/O) circuitry 80 connected in a conventional manner, a communications port 90, a rain sensor 91, a temperature sensor 92, and a power supply 95. Each of these components by itself is well known in the electronic industry, with the exception of the programming of the microprocessor in accordance with the functionality set forth herein. There are hundreds of suitable chips that can be used for this purpose. At present, experimental versions have been made using a generic Intel 80C54 chip, and it is contemplated that such a chip would be satisfactory for production models.

In a preferred embodiment of the present invention the irrigation scheduler has one or more common communication internal bus(es). The bus can use a common or custom protocol to facilitate communication between devices. There are several suitable communication protocols, which can be used for this purpose. At present, experimental versions have been made using an $I^2C$ serial data communication, and it is contemplated that this communication method would be satisfactory for production models. This bus is used for data transfer to and from a memory (e.g. EEPROM), and is used for communication with personal computers, peripheral devices, and measurement equipment including but not limited to rain sensors, water pressure sensors, and temperature sensors.

The switching circuit 40 is preferably an electrical switching circuit. The electrical switching circuit is one of the standard types that are well known in the art.

Figure 2:
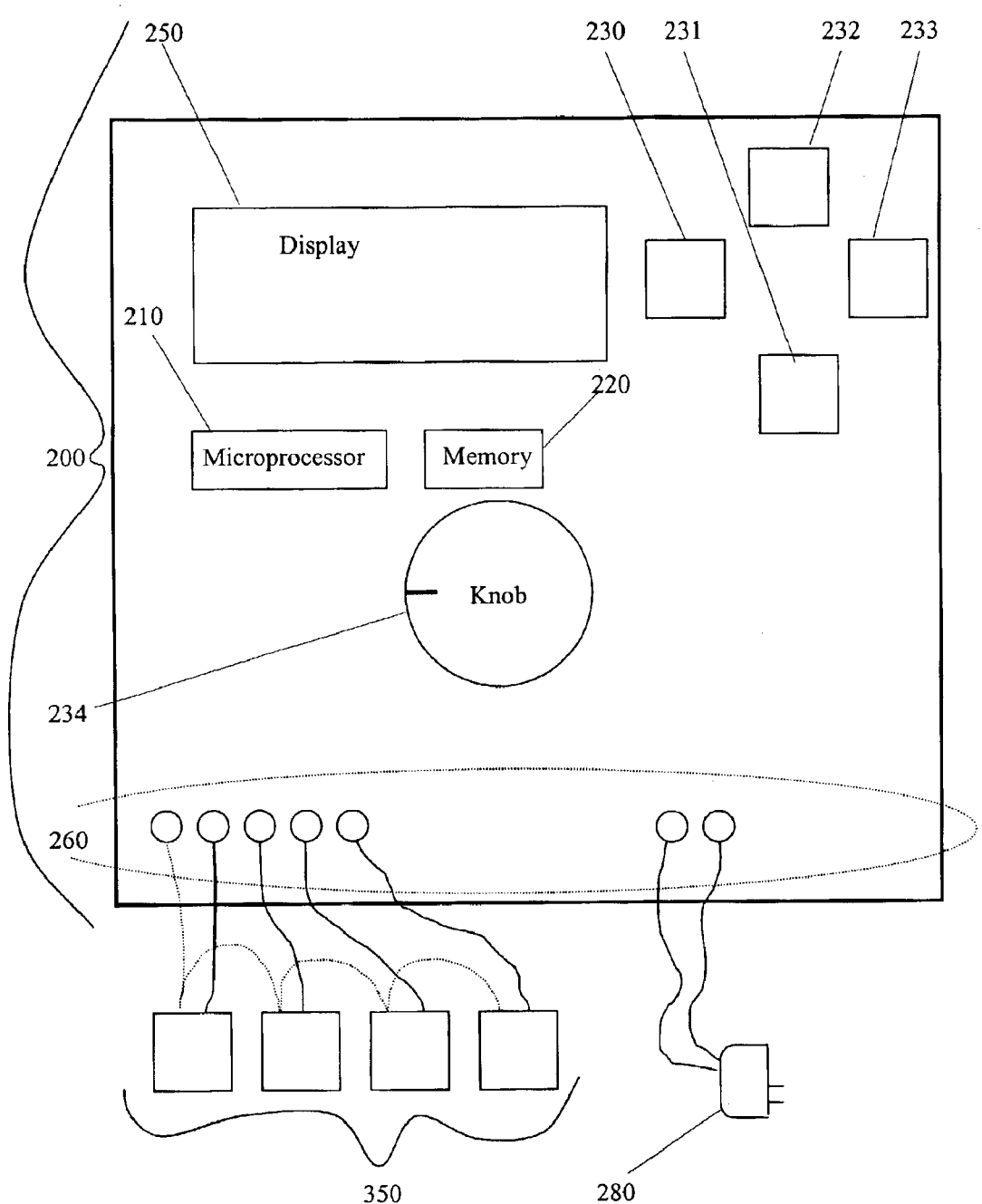
FIG. 2 is a schematic of an irrigation controller.

Referring to FIG. 2, an irrigation controller 200 according to the present invention generally includes a microprocessor 210, an on-board memory 220, some manual input devices 230 through 234 (e.g. buttons and/or knobs), a display screen 250, electrical connectors 260, which are connected to a plurality of valves 350, and a power supply 280. Each of these components by itself is well known in the electronic industry.

Figure 3:
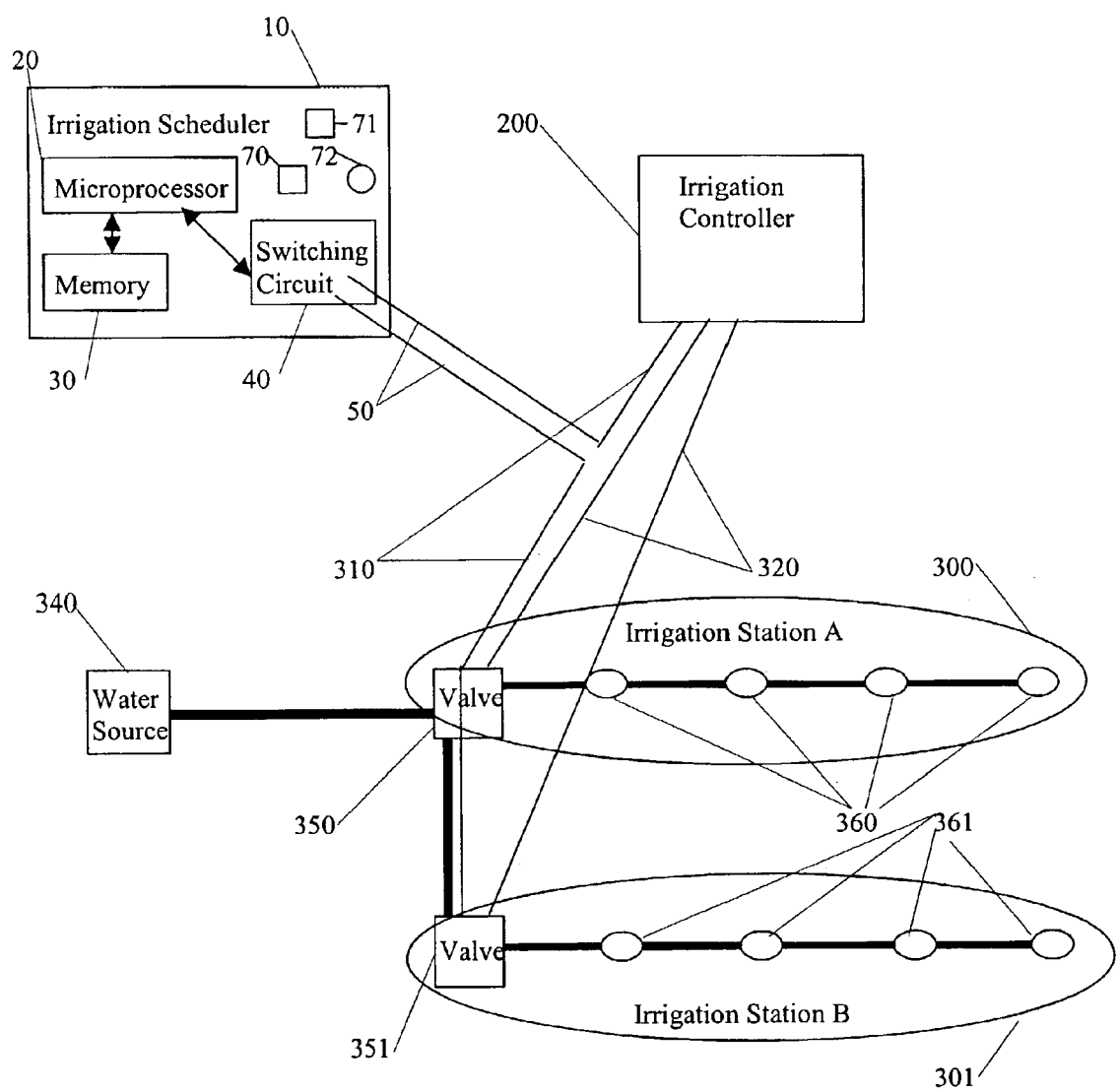
FIG. 3 is a block diagram of an automatic irrigation system with an irrigation scheduler according to an aspect of the present invention.

Referring to FIG. 3, it can be gleaned that irrigation scheduler 10 is not an integral part of the irrigation controller 200. The term integral as used in "not an integral part" means that the irrigation scheduler is separate and apart from the irrigation controller. That is, the irrigation controller and irrigation scheduler are housed in different housings and the controller can operate independent of the scheduler. In this respect, the microprocessor that determines watering days is external to the irrigation controller.

The switching circuit 40, disposed in the irrigation scheduler, provides an electrical connection 50 in series with the common return wire 310 from valves 350 and 351 to the controller 200. From the controller 200, parallel electrical control wires 320 couple irrigation valves 350 and 351. Although, two irrigation valves 350 and 351 and two irrigation stations 300 and 301 are shown, it can be appreciated that the irrigation controller can control any number of irrigation valves and irrigation stations. It should also be noted that although wired communications are depicted, wireless communications may be substituted.

In a preferred embodiment of the present invention the irrigation controller 200 is set to affect an irrigation schedule that would be used during the summer months. This irrigation schedule provides the highest quantity of water required to maintain the landscape plants in a healthy condition during the driest part of the year. Additionally, substantially equivalent watering and/or non-watering days would be entered in the irrigation controller and in the irrigation scheduler. Such entry or initialization can occur manually or automatically. "Substantially equivalent" in the context of the inventive subject matter means that the days that the irrigation scheduler is setup to water are the same or nearly the same as the days the controller is setup to water. It should be understood that a different time period can be substituted for day (e.g. week or half day, hour, etc) In a preferred embodiment, substantially equivalent is 100%. In a less preferred embodiment, substantially equivalent could mean less than 100%, so long as the difference does not materially effect the efficiency of the irrigation. The manual input devices, 70 through 72 (knobs and/or buttons), are used to set the scheduled watering and/or non-watering days in the irrigation scheduler.

A microprocessor, advantageously disposed in the irrigation scheduler, can use either an ETo value or weather data used in calculating the ETo value to at least partially derive the days, of the watering days, the irrigations will be executed on. The weather data, used in calculating the ETo value, can be selected from at least one of the following; temperature, humidity, solar radiation and wind. Additionally, the ETo value may be a current ETo value, an estimated ETo value or an historical ETo value.

Preferably, the ETo value or weather data used in calculating the ETo value will be received by the microprocessor 20 through the communications port 90 (FIG. 1) over a network such as the Internet. However, the ETo value or weather data used in calculating the ETo value may be received by the microprocessor 20, disposed in the irrigation scheduler, via a telephone line, radio, pager, two-way pager, cable, and any other suitable communication mechanism. Alternatively, the microprocessor 20 may receive the weather data, used in calculating the ETo value, directly from sensors including at least one of the following; a temperature sensor, humidity sensor, solar radiation sensor and wind sensor. The ETo value, from which at least partly the irrigation schedule is derived, is preferably a current ETo value, where the term "current" is used to mean within the last two weeks. It is more preferred, however, that the current weather information is from the most recent few days, and even more preferably from the current day. Regardless, ETo values may be potential ETo values received by the microprocessor 20 or estimated ETo values derived from weather data received by the microprocessor 20. The ETo value may also be a historic ETo value that is stored in the memory 30 of the irrigation scheduler 10.

The information received by the microprocessor 20 may include, in addition to ETo values or weather data used in calculating the ETo values, other meteorological, environmental, geographical and irrigation design factors that influence the water requirements of landscape plants and/or influence the quantity of water applied, such as, rain values, crop coefficient values and irrigation distribution uniformity values.

Referring again to FIG. 3, in a preferred embodiment of the present invention, the microprocessor 20, uses the ETo values or weather data used in calculating the ETo values and other meteorological, environmental, geographical and irrigation design factors to affect the opening and closing of the switching circuit 40. The opening and closing of the switching circuit affects the actuation of the valves 350 and 351 by the irrigation controller 200. When the switching circuit 40 is open there is no electrical connection between the irrigation controller 200 and the valves 350 and 351 and the valves 350 and 351 will remain closed. When the switching circuit 40 is closed there is an electrical connection between the irrigation controller 200 and the valves 350 and 351. When there is an electrical connection between the irrigation controller 200 and the valves 350 and 351 the irrigation controller 200 can control when the valves 350 and 351 are opened and closed. Therefore, on watering days when the switching circuit is closed the irrigation controller will initiate the opening of the valves for the appropriate summer run time minutes for each station 300 and 301. On days, or at times, when the switching circuit is open, the scheduler has interrupted control of the valve(s).

The switching circuit, disposed in the irrigation scheduler, must be in the closed position for the valves to open. On days when there is low evapotranspiration, the irrigation scheduler interrupts the circuit thereby preventing the valves from watering on those days. Interruption of the circuit effectively causes a loss of control of the valves by the irrigation controller. By interrupting the circuit, the scheduler is likely to reduce the amount of excess water that is applied to the landscape.

The microprocessor, disposed in the irrigation scheduler, determines when the switching circuit will be in the open and closed position based on ETo values or weather data used in calculating the ETo values and other meteorological, environmental, geographical and irrigation design factors. It is contemplated that on watering days, when the microprocessor determines that irrigations should occur, the microprocessor will cause the switching circuit 40 to be in the closed position during the entire watering day. Then at any time during the day, when the irrigation controller is scheduled to irrigate the landscape the irrigation will be executed. Alternatively, the microprocessor may cause the switching circuit 40 to be in the closed position for a period less than an entire watering day but at least for that portion of the watering day equal to or greater than the time it would take for the irrigation controller to irrigate the landscape or complete the execution of the irrigation cycles scheduled for that day. For example, if there were four stations and each station was set to water only one time during a watering day and for 21 minutes, the total time for an irrigation cycle to be completed would be approximately 84 minutes or 4 times 21 minutes.

Therefore, the microprocessor 20 will affect the switching circuit 40 to be in the closed position on specific watering days. Then, when the irrigation controller 200 actuates the valve 350 of Station A 300 or valve 351 of Station B 301 water will flow through the valves from the water source 340 to irrigate the landscape through the sprinkler heads of either 360 or 361, respectively.

FIG. 4 illustrates how the irrigation scheduler selectively interrupts the electrical circuit to control the execution of irrigations on watering days. The information received by the irrigation scheduler is used to derive an irrigation schedule. In this example, such information includes actual ETo data for Riverside, Calif. for the period from Jul. 1 to Jul. 15, 1999 and this data is listed in the ETo row of FIG. 4. ETo data is generally provided in inches per day, which in this example were converted into run-time minutes. The inches per day of ETo could either be converted into run-time minutes prior to the irrigation scheduler receiving the ETo data or the irrigation scheduler could be programmed to convert the ETo data into run-time minutes. In this example, it was assumed the ETo values, in FIG. 4, were converted into run-time minutes by the irrigation scheduler based on an application rate of one inch of water being applied per 60 minutes of irrigation application time. Although, the following data uses run-time minutes, it should be appreciated that inches of water or any other designation that reflects the amount of water to be applied to an irrigated area may be used. It is further assumed, in this example, that the maximum summer run-time minutes for the site, where the irrigation controller is located, is 21 minutes per day for each watering day. Sunday was a non-watering day, therefore, on the remaining days the run-time minute setting of the manual irrigation controller was set at 21 minutes, which is listed in the MIC row of FIG. 4.

In a preferred embodiment of the present invention, the microprocessor is programmed to accumulate run-times should the run-times be less than a certain minimum run-time that would result in a low amount of water being applied to the landscape (See U.S. Pat. No. 6,298,285 issued October, 2001 to Addink, et. al.). This provides for deep watering of the soil, which enhances deep root growth. It is further contemplated, that if the irrigation user only waters every other day, then the microprocessor can be programmed to accumulate the required amount of water that would have been applied on a daily basis so that the proper amount is applied every other day or at any interval of watering days the user may have their manual irrigation controller and the irrigation scheduler set to execute irrigations.

On July 1, the microprocessor, disposed in the irrigation scheduler, received the ETo data, which the irrigation scheduler converted into an equivalent amount of 14 run-time minutes. The microprocessor, as mentioned above, accumulates run-time and we will assume for this example that an irrigation application will not be applied unless the full 21 minute manual irrigation controller run-time setting will be applied by each station. Preferably, this threshold run-time minutes, on which the accumulation is based, will be manually entered into the irrigation scheduler during installation using a knob or buttons. Alternatively, the threshold accumulation level could be inputted into the irrigation scheduler at the factory or by some other appropriate means.

As mentioned above, on July 1, the ETo run-time minutes were 14 minutes and we will assume there was no carryover of run-time minutes from June 30. Therefore, since there are only 14 run-time minutes on July 1, which are less than the threshold level of 21 run-time minutes, there will not be an irrigation application on July 2 (Applications are based on the previous day's ETo values or previous days' accumulated ETo values). The 14 minutes of run-time will be carried over to the next application. On July 2, the ETo value is again 14 run-time minutes. The total accumulated run-time minutes for July 1 and July 2 are 28 run-time minutes (14+14=28), which exceeds the threshold level of 21 run-time minutes. Therefore, on July 3, a full 21 minutes of water will be applied to the landscape by each station controlled by the irrigation controller (IS row, day 3). There will be a carryover of 7 run-time minutes to the next application (28−21=7). The actual ETo value for July 3 is 13 run-time minutes plus the carryover of 7 minutes, which gives an accumulated run-time minutes of 20 minutes. If July 4 was a watering day, there would not have been an irrigation applied to the landscape because the accumulated run-time minutes were less than the 21 minute run-time threshold. However, there would not have been an irrigation on July 4 anyhow, because July 4 is not a watering day. Therefore, the 20 run-time minutes will be carried over to the next application. The total accumulated run-time minutes for July 4 is 34 minutes (20+14=34). Therefore, on July 5, which is a watering day there would be 21 minutes of watering applied by each station. Using a similar process, to determine when watering would occur, during the remaining days from July 5 to July 15 results in the irrigation scheduler selectively interrupting the electrical circuit on July $8^{th}$ and $9^{th}$ and preventing the execution of watering on those two days, which were watering days. The remaining watering days or July 10, 12, 13, 14 and 15, the irrigation scheduler permitted the execution of irrigations to occur as scheduled by the irrigation controller. In conclusion, in a preferred embodiment of the present invention, the ETo run-time minutes are accumulated until they are equal to or greater than the irrigation controller setting and then, on watering days, an application is made that is equal to the full 21 minute run-time setting of the irrigation controller. Any run-time minutes in excess of the threshold 21 run-time minutes, will be carried over to the next application.

The above example was based only on received ETo values. However, the information received by the microprocessor may include additional meteorological, environmental, geographical and irrigation design factors that influence the water requirements of landscape plants and/or influence the quantity of water applied, such as, rain values, crop coefficient values and irrigation distribution uniformity values.

There will very likely be days when an irrigation user will want to apply an irrigation, but the microprocessor, disposed in the irrigation scheduler, is preventing irrigations from being executed by maintaining the circuit switch in an open position. Therefore, in a preferred embodiment of the present invention, the user will have input means in the irrigation scheduler that will allow the user to override control by the irrigation scheduler. Preferably the input means would be buttons or knobs that could be used to either prevent or permit the microprocessor to interrupt the electrical circuit. During the period that the microprocessor was prevented from interrupting the electrical circuit, the irrigation controller could execute irrigation applications. Alternatively, a wireless control mechanism may communicate with the microprocessor to control when the microprocessor would be able to interrupt the electrical circuit to prevent the execution of irrigations by the irrigation controller. A wireless control mechanism would be especially advantageous for service personnel to use to prevent the microprocessor from interfering with the execution of irrigations by the irrigation controller. This would allow the service personnel to test the irrigation system without having to have access to the interior of the residence, where usually the irrigation scheduler and irrigation controller are located. The term "user" is taken to mean a natural person who has at least some interaction with the irrigation scheduler and irrigation controller and is situated locally to the irrigation scheduler and irrigation controller during a relevant time period.

Thus, specific embodiments and applications of the irrigation scheduler have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A method of controlling irrigation, comprising:

providing an irrigation controller programmed to execute irrigations on watering days by closing an electrical circuit connecting the controller and an irrigation valve;

providing an irrigation scheduler, distinct from the irrigation controller, that is programmed to execute irrigations on substantially equivalent watering days as the irrigation controller; and the irrigation scheduler selectively interrupting the electrical circuit to control execution of irrigations on watering days.

2. The method of claim 1, wherein the irrigations on watering days are at least partially determined by a microprocessor that is external to the irrigation controller.

3. The method of claim 2, further comprising the microprocessor using at least one of an ETo value and a weather data used in calculating the ETo value to at least partially derive the watering days.

4. The method of claim 3, wherein the weather data is at least one of temperature, humidity, solar radiation, and wind.

5. An irrigation scheduler that cooperates with a separate irrigation controller having an electrical circuit that extends from the controller to an irrigation valve, the irrigation scheduler programmed to:

receive at least one of an ETo value and a weather data used in calculating the ETo value; and interrupt the electrical circuit as a function of at least one of the ETo value and the weather data.

6. The irrigation scheduler of claim 5, wherein the irrigation scheduler is not an integral part of the irrigation controller.

7. The irrigation scheduler of claim 5, further comprising a switching circuit that interrupts the electrical circuit.

8. The irrigation scheduler of claim 5, wherein the weather data is at least one of temperature, humidity, solar radiation, and wind.

9. The irrigation scheduler of claim 5, wherein the ETo value comprises a current ETo value.

10. The irrigation scheduler of claim 5, wherein the ETo value comprises an estimated ETo value.

11. The irrigation scheduler of claim 5, wherein the ETo value comprises an historical ETo value.

12. An irrigation scheduler that cooperates with a distinct irrigation controller having an electrical circuit that extends from the controller to an irrigation valve, the irrigation scheduler programmed to:

receive at least one of an ETo value and a weather data used in calculating the ETo value;

use at least one of the ETo value and the weather data to interrupt the electrical circuit to control execution of irrigations on watering days; and receive inputs that interrupt the electrical circuit to prevent execution of the irrigations by the irrigation controller.

* * * * *